United States Patent [19]

Liu

[11] 4,430,476

[45] Feb. 7, 1984

[54] RESINOUS COMPOSITION COMPRISING A POLYCARBONATE RESIN, A LINEAR LOW DENSITY POLYOLEFIN AND AN ALKENYL AROMATIC COPOLYMER

[75] Inventor: Ping Y. Liu, Naperville, Ill.

[73] Assignee: General Electric Company, Mt. Vernon, Ind.

[21] Appl. No.: 343,949

[22] Filed: Jan. 29, 1982

[51] Int. Cl.³ .................... C08L 23/16; C08L 55/02; C08L 69/00
[52] U.S. Cl. .................................... 525/67; 525/133; 525/146; 525/92
[58] Field of Search .................. 525/133, 148, 92, 67, 525/146

[56] References Cited

U.S. PATENT DOCUMENTS

| | | | |
|---|---|---|---|
| 3,130,177 | 4/1964 | Grabowski | 525/67 |
| 3,431,224 | 3/1969 | Goldblum | 525/148 |
| 3,663,471 | 5/1972 | Schirmer et al. | 525/67 |
| 3,801,673 | 4/1974 | O'Connell | 525/148 |
| 3,852,393 | 12/1974 | Furukawa et al. | 525/67 |
| 3,873,641 | 3/1975 | Margotte et al. | 525/148 |
| 3,981,843 | 9/1976 | Yoshizaki et al. | 525/67 |
| 3,988,390 | 10/1976 | Prinz et al. | 525/67 |
| 4,111,895 | 9/1978 | Gergen et al. | 525/92 |
| 4,218,545 | 8/1980 | Serini et al. | 525/92 |

OTHER PUBLICATIONS

European Patent Application 4,645, 10/17/79.
Research Disclosure, Aug. 1981.
Chemical Abstracts, 95:62962k, 1981.

*Primary Examiner*—Allan Lieberman
*Attorney, Agent, or Firm*—Martin B. Barancik

[57] ABSTRACT

Novel thermoplastic molding compositions are disclosed which comprise a polycarbonate resin, an alkenyl aromatic copolymer and a linear low density polyolefin.

8 Claims, No Drawings

RESINOUS COMPOSITION COMPRISING A POLYCARBONATE RESIN, A LINEAR LOW DENSITY POLYOLEFIN AND AN ALKENYL AROMATIC COPOLYMER

BACKGROUND OF THE INVENTION

Polycarbonate resins have high impact resistance with ductility to notch or crack propagation at an average of up to about 0.2 inches thickness when the incident notch is 10 mils (thousandths of an inch) in radius. Above this average thickness the impact resistance and ductility of polycarbonate resins decline. This phenomena is commonly found in glassy plastics and is referred to as the critical thickness for notched impact resistance of a glassy plastic.

In addition, the impact strength of notched polycarbonate resins decreases as temperatures decrease below about −5° C. and also after aging the polymers at elevated temperatures above about 100° C. These temperatures are commonly found in applications where extremes of heat and cold are to be expected.

Thus, it is desirable to use a composition which extends the impact strength and ductility of polycarbonate resins to variable thickness parts or articles of use which resist embrittlement upon exposure to high or low temperature in a notched or scratched condition.

Compositions are known which extend the high impact resistance and ductility characteristics of polycarbonate resins to parts beyond the critical thickness and under low and high temperature aging conditions, but many of these compositions suffer from incompatibilities of the polymeric components which results in poor weldline or knit line strength in fabricated parts as evidenced by low double-gate impact strengths when measured according to ASTM D256.

It has now been found that the addition of a linear low density polyethylene, and an alkenyl aromatic copolymer to a polycarbonate resin results in a molding composition that may be utilized to make molded articles having improved weld line strengths when measured in accordance with ASTM D256, and improved heat stability as compared to prior art compositions that were based on a combination of a polycarbonate and a high density polyethylene or a low density high pressure polyethylene. In addition, these molding compositions generally have reduced splay or plate out, a wider temperature molding profile, less shear sensitivity, improved hydrolytic stability and enhanced chemical resistance as compared to compositions that contain high density polyethylene or low density high pressure polyethylene.

The preferred compositions according to the present invention will have a weld line strength according to ASTM D256 of greater than about 7.0 ft/lbs. and preferably above about 12.0 ft/lbs.

DETAILED DESCRIPTION OF THE INVENTION

The compositions of the invention comprise:
(a) a high molecular weight polycarbonate resin;
(b) a linear, low density polyolefin; and
(c) an alkenyl aromatic copolymer which results in a high impact polycarbonate composition.

The polycarbonate resin may be of the formula:

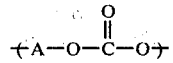

wherein A is a divalent aromatic radical. Preferred polycarbonate resins are of the formula:

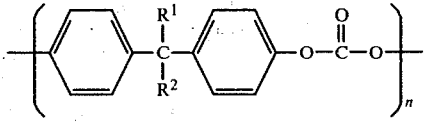

wherein $R^1$ and $R^2$ are hydrogen, (lower) alkyl or phenyl and n is at least 30 or preferably between 40 and 400. The term (lower) alkyl includes alkyl groups of from 1–6 carbon atoms.

High molecular weight, thermoplastic, aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of 0.30 to 1.0 dl/g as measured in methylene chloride at 25° C. These polycarbonates are derived from dihydric phenols such as, for example, 2,2-bis(4-hydroxyphenyl)-propane, bis(4-hydroxyphenyl)methane, 2,2-bis(4-hydroxy-3-methylphenyl)propane, 4,4-bis(4-hydroxyphenyl)heptane, 2,2-(3,5,3'-5'-tetrachloro-4,4'-dihydroxyphenyl)propane, 2,2-(3,5,3',5'-tetrabromo-4-4'-dihydroxydiphenyl)propane, and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The linear low density polyolefins that may be utilized in the practice of the invention are well known materials which are exemplified by linear low density polyethylene (LLDPE). These polymers may be prepared from state of the art polymerization processes such as those described in U.S. Pat. No. 4,076,698 and Eur. Pat. Appl. No. 4,645, both of which are incorporated by reference. These polymers have a density between about 0.89 and about 0.96 gms/cc and a controlled concentration of simple side chain branching which distinguishes them from polymers such as high pressure low density polyethylene and high density polyethylene made from a Ziegler catalyst system. The preferred range of density is from 0.915 to 0.945 gms/cc. The LLDPE polymers are actually copolymers of ethylene with one or more alpha olefins of $C_3$ to $C_{18}$, preferably $C_3$ to $C_{10}$, and more preferably $C_4$ to $C_8$. The alpha olefins should not contain any branching in any of their carbons which is closer than the fourth carbon atom to the terminal carbon atom participating in the unsaturation. From 1 to 10 mol % of the alpha olefin may be used or more preferably from 2 to 7 mol % may be used.

The preferred LLDPE copolymers may be made from ethylene and one or more alpha olefins selected from the group consisting of propylene, butene-1, heptene-1, 4-methyl pentene-1 and octene-1. In the compositions of this invention, the LLDPE polymer made with butene-1 is most preferred. These preferred copolymers have a melt flow ratio of $\geq 22$ to $\leq 32$ and preferably $\geq 25$ to $\leq 30$. The melt flow ratio of these preferred copolymers is another means of indicating the molecular weight distribution of a polymer. The melt flow ratio (MFR) range of $\geq 22$ to $\leq 32$ thus corresponds to a Mw/Mn value of about 2.7 to 4.1 and the MFR range of $\geq 25$ to $\leq 30$ corresponds to a Mw/Mn range of 2.8 to 3.6.

The density of the copolymer, at a given melt index level of the copolymer, is primarily regulated by the amount of the comonomer, which is copolymerized with the ethylene. The addition of increasing amounts of the comonomers to the copolymers results in a lowering of the density of the copolymer.

The preferred copolymers have an unsaturated group content of $\leq 1$ and preferably $\geq 0.1$ to $\leq 0.3$ C=C/1000 carbon atoms and n-hexane extractables content (at 50° C.) of less than about 3 and preferably less than 2 weight percent. The preferred materials are made by the Unipol process which is described in Chem. Eng., Dec. 3, 1979, pp. 80–85 which is incorporated by reference.

The term alkenyl aromatic copolymer is used herein to include those thermoplastic resins which when combined with a polycarbonate resin and LLDPE result in improved impact strength. These copolymers have at least 25% of their units derived from a monomer of the formula:

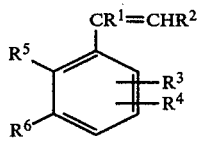

wherein $R^1$ and $R^2$ are selected from the group consisting of lower alkyl of from 1 to 6 carbon atoms or lower alkenyl of from 2 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl of from 1 to 6 carbon atoms or lower alkenyl of from 2 to 6 carbon atoms or $R^5$ and $R^6$ may be concatenated together with hydrocarbyl groups to form a naphthyl group with the depicted phenyl ring. These compounds are free of any substituent that has a tertiary carbon atom.

As used herein the term alkenyl aromatic copolymer includes copolymers such as styrene-acrylonitrile; copolymers comprising acrylonitrile, butadiene, and an alkenyl aromatic monomer such as ABS resins, rubber modified high impact styrenes which are made with polybutadiene rubber, natural crepe rubber, synthetic SBR rubber, neoprenes, and the like which when combined with a polycarbonate and LLDPE result in a high impact composition. The term high impact as used in this context means a double gate impact of above 7.0 ft/lbs. as measured according to ASTM D256. Also included are ABA type block copolymers such as styrene-butadiene-styrene block copolymers including selectively hydrogenated derivatives thereof as well as interpolymers of alkenyl aromatic monomers with rubbers and alkyl acrylic esters.

The copolymers of acrylonitrile, butadiene and an alkenyl aromatic monomer are well known. The preferred copolymers are made from acrylonitrile-butadiene-styrene and acrylonitrile-butadiene-alpha-methyl styrene. General methods for preparing these polymers are described in U.S. Pat. Nos. 4,107,232 and 3,130,177 which are incorporated by reference.

The weight percents of the acrylonitrile-butadiene-alkenyl aromatic compound copolymers are from 15–25:20–45:65–40 and preferably 15–20:30–40:55–30. Copolymers or blends containing copolymers derived from acrylonitrile, butadiene, an alkenyl aromatic compound and an acrylic monomer may also be employed in the practice of the invention. The weight percents of these materials expressed as the ratio of the comonomers are from 1–25:20–50:30–50:15–25 of acrylonitrile:butadiene:alkenyl aromatic compound:acrylic compound. These materials are commercially available or may be made using conventional procedures. In addition, certain of these materials may be prepared according to U.K. Pat. No. 939,484 or by the procedures described in the Encylopedia of Polymer Science, Vol, 1, pp. 436–444, Interscience (1964) or in U.S. Pat. No. 3,864,428 all of which are incorporated by reference.

The compositions of the invention may comprise from 35.0 to 90.0 parts by weight of polycarbonate resin; 20 to 0.5 parts by weight of the linear low density polyethylene; and from 9.5 to 45 parts by weight of an alkenyl aromatic copolymer per 100 parts by weight of polycarbonate, linear low density polyethylene and alkenyl aromatic copolymer. A preferred range comprises from 50.0 to 85.0 parts by weight of polycarbonate; from 10 to 40 parts by weight of an alkenyl aromatic copolymer and from 1.0 to 15.0 parts by weight of linear low density polyethylene per 100 parts by weight of polycarbonate, linear low density polyethylene and alkenyl aromatic copolymer.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the compositionn, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, is also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Flame retardant amounts of flame retardants may also be utilized in the composition of the invention in amounts of from 0.5–50 parts by weight of the resinous components. Examples of suitable flame retardants may be found in U.S. Pat. Nos. 3,936,400 and 3,940,366 which are incorporated by reference. Other conventional non-reinforcing fillers, antioxidants, extrusion aids, light stabilizers, foaming agents such as those disclosed in U.S. Pat. No. 4,263,409 and Ger. Offen. No. 2,400,086, which are incorporated by reference and the like may be added to the composition of the invention if desired.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

The term double gate is used to refer to the preparation of a molded sample in a mold having two entry ports that result in a weld line at the junction of the fluid resin in the mold during the molding cycle. The design, preparation of the molded part, and the testing of the following examples are according to ASTM D256.

DESCRIPTION OF THE PREFERRED EMBODIMENTS

The following examples illustrate the invention. All parts are by weight. Izod impact strengths are reported as ft.lb/in. of notch. Double gate (DG) values are reported in ft.lb. and the superscripts refer to the percent of the samples that were ductile.

EXAMPLE 1

A composition was prepared with 76.92 parts by weight of a polycarbonate of 2,2-bis-(4-hydroxyphenyl)propane having an intrinsic viscosity of about 0.46 dl/g as measured in methylene chloride at 25° C.; 19.23 parts by weight of an ABS* resin and 3.85 parts by weight of a linear low density polyethylene made with butene-1, by dry blending the components followed by extrusion at about 265° C. and molding into test samples. The impact strengths of the test samples are reported in Table 1.

*K2938-Kralastic; acrylonitrile/butadiene/styrene:22/23/55 USS Chemicals, Baton Rouge, LA.

TABLE 1

| SAMPLE | LLDPE | DG |
| --- | --- | --- |
| A | Escorene LPX-16 | 13.7$^{100}$ |

CONTROL EXAMPLE 1

A composition was prepared with 76.92 parts by weight of a polycarbonate of 2,2-bis-(4-hydroxyphenyl)propane having an intrinsic viscosity of 0.46 dl/g as mesured in methylene chloride at 25° C.; 19.23 parts by weight of a butadiene-styrene resin* and 3.85 parts by weight of a linear low density polyethylene made with butene-1 according to the procedure of Example 1. This composition had the impact strength recorded in Table 2.

*K Resin KR03-Philips Petroleum Co., Bartlesville, Okla.

TABLE 2

| SAMPLE | LLDPE | DG |
| --- | --- | --- |
| B | Escorene LPX-12 | 2.1$^{0}$ |

EXAMPLE 2

A composition was prepared according to the procedure of Example 1. The composition contained 86.0 parts by weight of the polycarbonate used in Example 1; 10 parts by weight of an ABS resin** and 4 parts by weight of a linear low density polyethylene made with butene-1. This composition had the impact strength reported in Table 3.

**K2540 Kralastic: acrylonitrile/butadiene/styrene:17/38/45.

TABLE 3

| SAMPLE | LLDPE | DG |
| --- | --- | --- |
| C | Escorene LPX-12 | 13.9$^{100}$ |

CONTROL EXAMPLE 2

A control example was prepared according to the procedure of Example 1 which contained 90.0 parts by weight of the polycarbonate of Example 1 and 10 parts of an ABS*** resin. The impact strengths of the test samples are reported in Table 4.

***Cyclolac L-1000; acrylonitrile/butadiene/styrene. 18/30/52-Borg Warner, Parkersburg, W. Va.

TABLE 4

| SAMPLE | LLDPE | DG |
| --- | --- | --- |
| D | -0- | 3.6⁰ |

The results of the examples clearly demonstrate the effect of the composition on impact as measured by the double gate test.

Obviously, other variations are possible in light of the above teachings. It is therefore to be understood that changes may be made in the particular embodiments of the invention described which are within the full intended scope of the invention as defined by the appended claims.

What is claimed is:

1. A composition which comprises
   a. from about 35 to 90 weight percent of an aromatic polycarbonate resin;
   b. from about 0.5 to 20 weight percent of linear low density polyethylene having a density of from about 0.89 to 0.96 gms/cc; and
   c. from about 9.5 to 45 weight percent of an acrylonitrile-butadiene-styrene resin or an acrylonitrile-butadiene-alphamethyl styrene resin;
   the weight percent of each of a, b and c based upon the total weight of a, b and c and the impact strength of said composition as measured by the ASTM D-256 double gate test being above about 7.0 ft/lbs.

2. A composition in accordance with claim 1 wherein the density of the linear low density polyethylene is from about 0.915 to 0.945.

3. A composition in accordance with claim 2 wherein the linear low density polyethylene is prepared from ethylene and an alpha olefin having from four to eight carbon atoms, inclusive.

4. A composition in accordance with claim 3 wherein the alpha olefin is butene-1.

5. A composition in accordance with claim 2 wherein the aromatic polycarbonate is of the formula

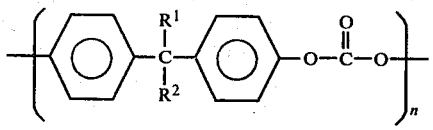

wherein $R^1$ and $R^2$ are hydrogen, (lower) alkyl or phenyl and n is at least 30.

6. A composition in accordance with claim 2 wherein the aromatic polycarbonate is derived from bisphenol A.

7. A composition in accordance with claim 3 wherein the aromatic polycarbonate is derived from bisphenol A.

8. A composition in accordance with claim 4 wherein the aromatic polycarbonate is derived from bisphenol A.

* * * * *